United States Patent [19]
Pradt

[11] 3,919,837
[45] Nov. 18, 1975

[54] METHOD AND APPARATUS FOR STARTUP OF A WET AIR OXIDATION UNIT PROVIDED WITH ROTATING AIR COMPRESSORS DRIVEN BY ROTATING EXPANDERS

[75] Inventor: Louis A. Pradt, Wausau, Wis.
[73] Assignee: Sterling Drug, Inc., New York, N.Y.
[22] Filed: Mar. 7, 1974
[21] Appl. No.: 448,884

[52] U.S. Cl. ............ 60/39.05; 60/39.14; 60/39.19; 60/39.58
[51] Int. Cl.² ..... F02G 3/00; F02C 7/26; F02C 1/00
[58] Field of Search ......... 60/39.05, 39.14, 39.18 R, 60/39.18 B, 39.02, 39.12, 39.46, 39.29, 39.03, 39.19, 39.58

[56] References Cited
UNITED STATES PATENTS

| | | | |
|---|---|---|---|
| 2,227,666 | 1/1941 | Noack | 60/39.14 X |
| 2,665,249 | 1/1954 | Zimmermann | 60/39.05 X |
| 2,973,622 | 3/1961 | Nettel | 60/39.14 X |
| 3,626,874 | 12/1971 | Grant | 60/39.05 X |
| 3,704,587 | 12/1972 | Krieb et al. | 60/39.03 |
| 3,765,167 | 10/1973 | Rudolph et al. | 60/39.18 B X |
| 3,798,898 | 3/1974 | Delahaye | 60/39.02 |

OTHER PUBLICATIONS

*New Waste Disposal Process,* F. J. Zimmermann, "Chem. Eng.," McGraw–Hill Publishing Co., New York, 1958, pp. 117–118.

*Primary Examiner*—C. J. Husar
*Assistant Examiner*—Thomas I. Ross
*Attorney, Agent, or Firm*—Charles R. Fay

[57] ABSTRACT

Starting a wet oxidation unit by initially supplying a small part of full power to start the compressor-expander train, the resultant low volume of low pressure air being by-passed around the unit to expander inlet, heating and saturating this air, and allowing an increase in air and pressure volume providing additional power, and continuing this procedure until pressure is reached at which a small amount of this air can be admitted to the unit, gradually increasing the air to the unit and reducing the external heat and power to a shut-off point.

7 Claims, 8 Drawing Figures

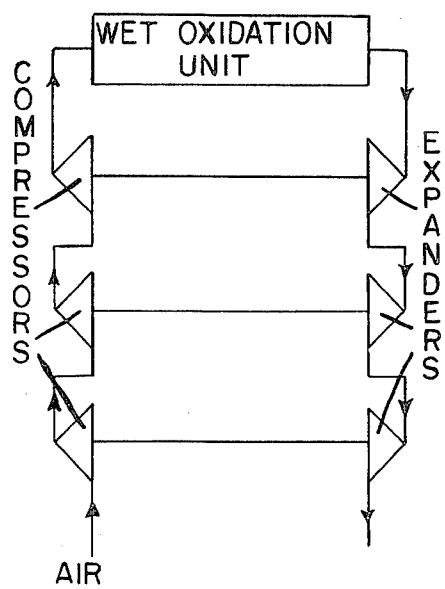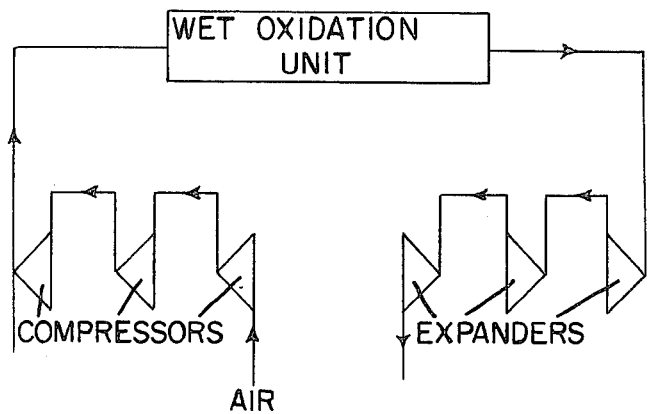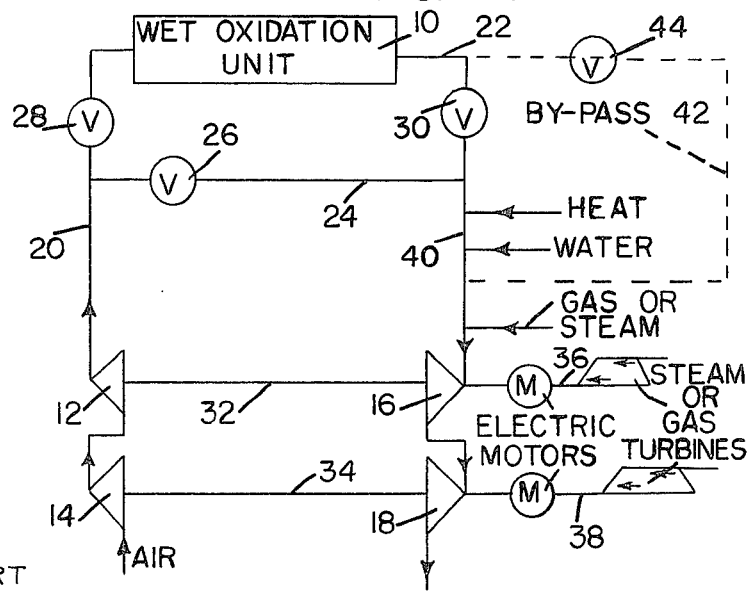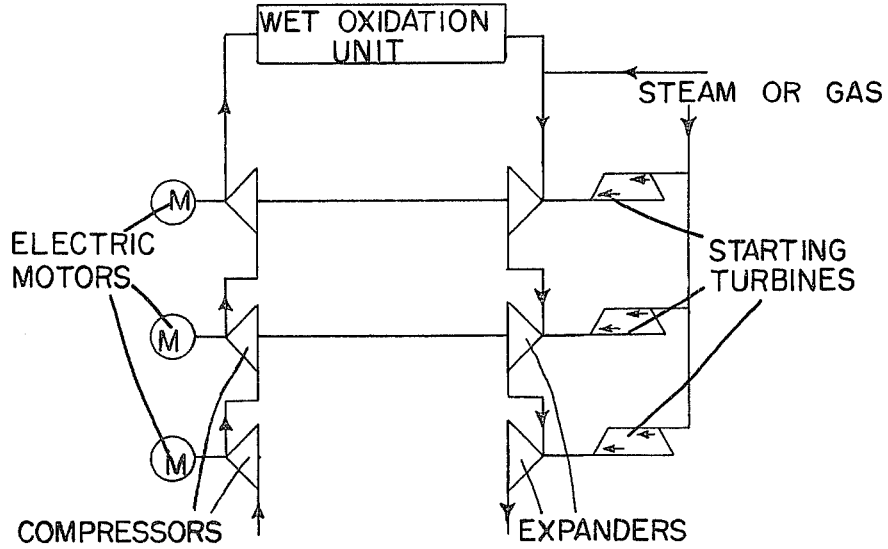

METHOD AND APPARATUS FOR STARTUP OF A WET AIR OXIDATION UNIT PROVIDED WITH ROTATING AIR COMPRESSORS DRIVEN BY ROTATING EXPANDERS

BACKGROUND OF THE INVENTION

The most economical and practical way of supplying air to a large wet oxidation unit is by rotating air compressors. These can be axial or centrifugal (as opposed to reciprocating air compressors). The best way to drive these air compressors is by turbine-expanders supplied by exhaust gases from the wet oxidation unit itself. This eliminates the need for electric generators, electric motors, electrical equipment and provides a more efficient system.

FIGS. 1 and 2 show the arrangement of two such systems. Multiple casings or stages will always be required for compressing air to the range used in wet oxidation, that is, about 300 PSIG to about 3000 PSIG. Each casing can be on a separate shaft with a separate expander, see FIG. 1, or all compressor and expander casings can be on the same shaft as in FIG. 2. It will also be recognized that it might be possible to have only one casing at low pressures, or it would be possible under other conditions to have two, three, four or more casings depending on the situation.

A disadvantage of the systems shown in FIGS. 1 and 2 is that it is difficult to start up the system. Rotating air compressors are rather inflexible, that is, they cannot be operated at low capacity and full system pressure. At least 70% of the maximum power is required in order to bring a compressor train up to full pressure. In the systems of FIGS. 1 and 2, there is no exhaust gas available to drive the expanders when the wet oxidation unit is stopped. Thus, the compressor-expander train must be started with some external source of power. To this end, external steam or gas from a gas turbine could be admitted directly to the expanders or auxiliary electric motors or steam or gas turbines could be connected to the shafts. FIG. 3 shows how these could be arranged. The problem is that a very large quantity of power is required in order to bring the compressors to the full design pressure. For example, in a wet oxidation plant for black liquor from a 750 ton/day pulp mill, at least 45000 horsepower would be needed to bring the unit to full pressure. This would require something like 450,000 lbs./hour of steam, which represents all of the steam available in the pulp mill. This would be intolerable in an actual situation. The gas turbine or electric motors would be inordinately large likewise.

The startup of such a compressor-expander train can be accomplished with lower external power by "boot strapping" as follows: The train would be started with a small amount of external power, for example about 10% of full power, by any of the means described above in order to bring the compressor train up to speed. Air will discharge from the compressor at a low flow volume and low pressure. This low pressure, low volume air can be admitted to the wet oxidation system. Some oxidation will take place, and the gas exhausting from the unit will have an increased enthalpy. This gas will be returned to the expanders, and the shaft power will increase which will allow an increase in both the pressure and flow volume from the compressors. In this manner, the unit can be gradually brought up to full flow volume and pressure. However, there are some disadvantages to this method:

1. During the initial startup, the liquor exiting from the unit will be partially oxidized and degraded.
2. It is not possible to independently bring the compressor-expander train to full pressure for testing or adjusting.
3. It would not be possible to start the compressor-expander train while the reactor is under pressure in a hot condition. This condition is often encountered during temporary shutdowns. It might also be desirable to have a normal startup procedure in which the reactor is heated and brought to a high pressure.
4. Some organic materials treated by wet oxidation do not oxidize satisfactorily at lower pressures, this procedure resulting in discharge of organics to the atmosphere, causing air pollution.

The system could be "boot strapped" by bypassing the initial low pressure, low volume flow of air around the wet oxidation system and by heating the air before directing it back to the expander inlet. The air could be heated with a heat exchanger or directly by a combuster by injecting fuel into the air stream. The problem here is that the expanders are designed for wet oxidation system gases which generally contain a large quantity of water vapor and are at a relatively low temperature, the maximum temperatures being about 600 or 700° F., and the usual temperatures about 500° F. Often these gases are saturated. If dry air alone is used, much higher temperatures are required. For example, in a system designed for 2000 PSIG and an expander inlet temperature of 520° F. and with an air flow of 5000 lbs. per minute (dry basis), about 33,000 horsepower are required for the air compressor. For hot, dry air, it would be necessary to have an expander inlet temperature of at least 1275° F. This creates design problems for the expanders, and this is much higher than the normal inlet temperature of 520° F. Dry air might be heated to a lower temperature, say 600° F., and reheated after each expander stage. However, calculations show that the horsepower developed will be insufficient to bring the compressor up to full pressure. For example, in a 3000 PSIG system, if air is heated to 600°F. in four stages, the power developed in the expander will be only about 70% of that required to compress the same air to 3000 PSIG. Therefore, it would not be possible to start up the system unless a larger amount of external power and a more complicated apparatus is used than that of the present invention.

The purpose of this invention is to provide an apparatus or method of startup which eliminates the above disadvantages.

SUMMARY OF THE INVENTION

A system for starting a wet oxidation unit in which air is supplied by rotating air compressors driven by rotating expanders in which the compressor-expander train is started by initially supplying a small percentage of the full power, for example, about 10%, under which condition a low flow volue of low pressure air is discharged from the compressor and is bypassed around the wet oxidation unit to the inlet of the expanders through a device which heats and saturates the air, said heated saturated air providing additional power which allows an increase in air flow volume and pressure and allowing the pressure and flow volume to build up in this "boot strapping" manner until a suitable pressure is reached at which air can be admitted to the wet oxidation unit, at which time a small amount of the air flow is admitted to the wet oxidation unit initiating the wet oxidation reaction, the exhaust gases from the wet oxidation unit joining the bypass heated and saturated air to the expander, allowing a proportional amount of heating to be reduced and thus continuing and gradually increasing the proportion of air to the reactor, reducing the external power until such power is no longer needed and until eventually all of the air is entering the reactor and all sources of external heat and power are shut off, the unit being then self-sustaining and fully started up.

BRIEF DESCRIPTION OF THE DRAWINGS

FIGS. 1, 2, and 3 are diagrams illustrating the background of the invention;

FIG. 4 is a diagram illustrating the present invention;

PREFERRED EMBODIMENT OF THE INVENTION

Figure 5:
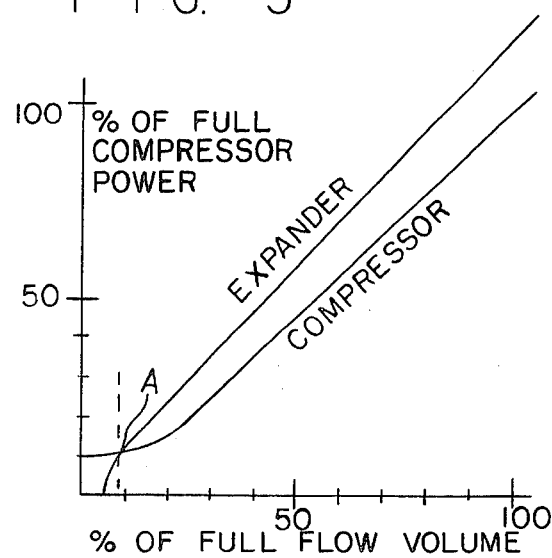
FIG. 5 is a chart showing the power variation with the flow and power increase.

An illustration of the invention which is shown in FIG. 4 includes the wet oxidation unit or reactor 10 which as shown is serviced by a pair of air compressors 12 and 14 in line driven by corresponding expanders 16 and 18. The compressors force air along the line 20 to the wet oxidation unit which has an exit line 22. There is a bypass 24 controlled by a valve 26 and the oxidation unit may be cut off by valves 28 and 30. There may be as many shafts 32, 34 as desired and as many of these units can be used as may be found to be necessary.

The expander-compressor train can be started up by e.g., an external force of power that may be gas, steam, direct turbine, or electric motor drive, or any combination of these, these being shown one unit for each expander train generally indicated at 36 and 38.

Additionally, heat, water, and gas or steam may be admitted into the expander inlet pipe 40 which is a continuation of the outlet 22 controlled by valve 30. There is also shown a bypass indicated at 42 controlled by valve 44 which may be applied to the system as is shown in the diagram at FIG. 4.

The startup procedure for this invention is as follows: the initial low volume, low pressure air is bypassed around the wet oxidation system and is heated, but water is injected into the air stream either before or after the heater and the water is vaporized providing conditions which are nearly identical to the expander inlet design conditions. The compressor-expander train is started up by some external source of power, that is, gas, steam or a direct turbine or electric motor drive or any combination of the above. When the train is up to speed, air at low pressure and low flow volume, for example, if the design flow volume is 5000 lbs. per minute and the design pressure 2000 PSIG, the flow volume may be 500 lbs. per minute and the pressure 200 PSIG at this stage in the startup procedure. Air is bypassed around the wet oxidation unit by closing valves 28 and 30 and opening valve 26 allowing the gas to flow back to the expander inlet. The air flows through a device that heats the air and also saturates it with water vapor. The admission of this gas to the expander causes an increase in expander power which increases the power to the compressor shaft which further increases the flow volume and pressure of the compressor discharge.

The curves in FIG. 5 show how the power required by the compressor and produced by the expander will vary as the flow and power increases. The external power required is never more than about 10% of full power. At some point, the expander power will cross the compressor power, point A on the curve; and the external power source may then be shut off. After this point, the flow and volume and pressure will continue to rise until some pressure is reached at which air can be admitted to the wet oxidation system. This may be the full design pressure or some somewhat lower pressure as necessary. At this point (refer to FIG. 4), valve 28 is opened slightly allowing a small amount of air to enter the wet oxidation system. Valve 30 is opened to allow exhaust gas to exit from the wet oxidation system. The air will cause the wet oxidation reaction to initiate. Liqupr containing organic material will also be admitted to the system as necessary. The air exhausting from the wet oxidation unit to valve 30 will join the stream of heated saturated air going to the expander, and since this stream from the wet oxidation unit has had an increase in enthalpy, the heat input to the gas stream can now be reduced accordingly. Then, valve 28 is opened further admitting more air to the wet oxidation unit and more organic-containing liquor is pumped into the unit. This allows a further reduction of heat to the gas stream. This procedure continues until all of the air is going to the wet oxidation unit with bypass 26 closed. The external heat can be shut off, and then the unit is started and self-sustaining.

Figure 6:
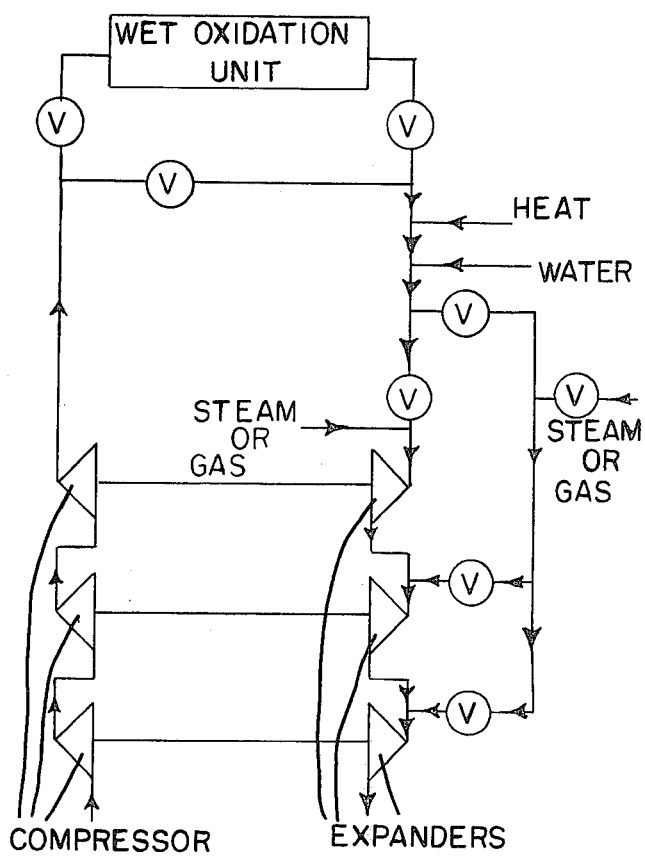
FIG. 6 is a diagram showing a variation of FIG. 4.

If the unit is started up with external steam being admitted to the expanders, it can be seen that the steam pressure will probably initially be higher than the air bypassing through the heater to the expander inlet. It will therefore be necessary to divert the heated and saturated air from the first stage or first casing of the expander to some downstream point where the pressure is lower. This arrangement is shown in FIG. 6. Conversely, at some point in the startup procedure, the air pressure may become greater than the steam pressure at which point it would be necessary to divert steam to a downstream point. It would be more desirable however to design the system so that a self-sustaining condition (point A on FIG. 5) will be reached before the air pressure becomes higher than the steam pressure.

If a gas turbine is used to supply gas to the expanders, the gas from the gas turbine may have to be diverted to a downstream point.

Figure 7:
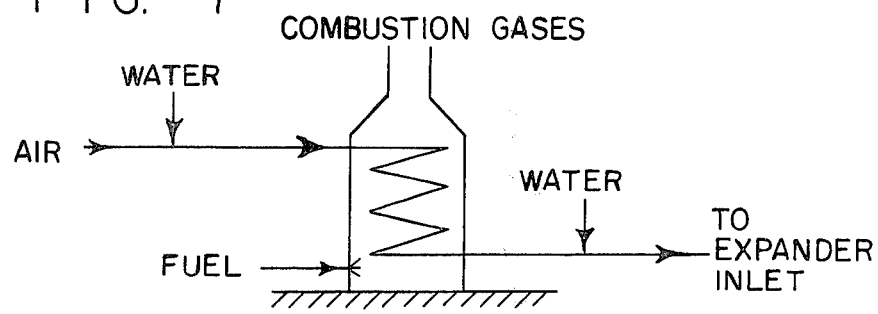
FIG. 7 illustrates a device in which the air may be heated in a heat exchanger.
Figure 8:
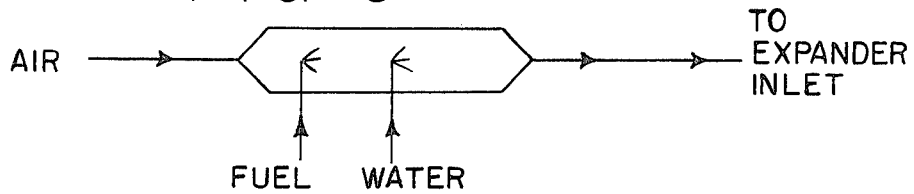
FIG. 8 is a diagram of a system in which air is heated by direct combustion of fuel injected into the air stream.

Suitable apparatus for heating and saturating the air are shown in FIGS. 7 and 8. FIG. 7 shows a device in which the air is heated in a heat exchanger. Water can be injected either before or after the heat exchanger, but preferably before the heat exchanger. FIG. 8 shows a system in which air is heated by direct combustion of fuel injected into the air stream. Water would be injected immediately after the combustion zone. Two or more such devices in series could be used.

In practice, it is believed that the best way of heating and saturating air is by direct injection of high pressure wet steam generated by e.g. oil field flooder.

It is appreciated that the devices described above will consume large amounts of fuel. However, this fuel consumption will only be during the short startup period. The apparatus described is simple and relatively inexpensive compared to alternate methods, for example, electric motor or turbine drives, or supplying sufficient steam directly to the expanders to provide power to bring the system to full pressure.

I claim:

1. A wet oxidation unit and operating and control means therefor comprising a wet oxidation reactor, a compressor, an expander driving the compressor, a line from the compressor to the inlet of the reactor and a line forming an outlet for the reactor, said outlet line being connected to the expander, and a bypass between the inlet to the reactor and the outlet, a control valve in the bypass and control valves between the bypass and the inlet end of the reactor and the outlet end of the reactor, means providing a low flow volume of low pressure air from the compressor through the bypass to the inlet for the expander, and means for heating and saturating the air prior to entry to the expander, wherein said heated saturated air provides additional power for the expander providing an increase in air flow volume and pressure from the compressor through the bypass.

whereby air from the compressor may be gradually introduced to the reactor initiating the wet oxidation reaction, said valves providing a control in which the exhaust gases from the reactor joins the bypass heated and saturated air to the expander thereby gradually increasing expander energy through a cycle which terminates with a full flow of air from the compressor through the reactor.

2. The wet oxidation unit of claim 1 wherein the heating means in the inlet for the expander comprises a heat exchanger.

3. The wet oxidation unit of claim 1 wherein the heating means includes means for injecting fuel directly into the air stream and means for combusting the fuel.

4. The wet oxidation unit of claim 1 wherein the air heating and saturating means comprises a source of steam.

5. A method for starting a wet oxidation unit including a reactor, air compressors, expanders for driving the compressors, an inlet line controlled by a valve for the reactor, and an outlet line controlled by a valve from the reactor, the last-named outlet line being continuous to the inlet of the expander and a bypass between the inlet line and the outlet line, the method comprising initially supplying a relatively small percentage of full power to the expander thereby discharging from the compressor a low flow volume of low pressure air, bypassing the latter around the reactor to the inlet of the expander while at the same time heating and saturating the air to the expander, said heat and saturated air thereby providing additional power, providing an increase in air flow volume, and pressure from the compressor, continuing the above-named steps and building up pressure and flow volume for a period of time until suitable pressure is reached when air can be admitted to the wet oxidation unit at which point air is admitted thereto in a small amount initiating the wet oxidation reaction, directing the exhaust gases from the reactor to join the continually bypassed heated and saturated air to the expander, reducing a proportional amount of the heating and saturating step while continuing and gradually increasing the proportion of air to the reactor, and at the same time gradually reducing external power, when a point is reached that all of the air enters the reactor and all sources of external heat and power are shut off at which time the unit is self-sustaining and fully started.

6. The method of claim 5 wherein the step of heating and saturating the air is accomplished by the direct injection of high pressure wet steam.

7. The method of claim 5 wherein the step of heating and saturating the air includes injecting fuel directly into the air stream, and igniting the fuel.

* * * * *